United States Patent
Kerner

(10) Patent No.: US 9,081,377 B2
(45) Date of Patent: Jul. 14, 2015

(54) CLOSED-LOOP CONTROL STRUCTURE FOR DAMPING LOW-FREQUENCY VIBRATIONS

(71) Applicant: Dr. Johannes Heidenhain GmbH, Traunreut (DE)

(72) Inventor: Norbert Kerner, Traunwalchen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 402 days.

(21) Appl. No.: 13/753,951

(22) Filed: Jan. 30, 2013

(65) Prior Publication Data

US 2013/0204404 A1   Aug. 8, 2013

(30) Foreign Application Priority Data

Feb. 2, 2012   (DE) .......................... 10 2012 201 562

(51) Int. Cl.
*G05B 19/19* (2006.01)
*G05B 19/404* (2006.01)

(52) U.S. Cl.
CPC .............. *G05B 19/19* (2013.01); *G05B 19/404* (2013.01); *G05B 2219/41121* (2013.01); *G05B 2219/42062* (2013.01)

(58) Field of Classification Search
None
See application file for complete search history.

(56) References Cited

U.S. PATENT DOCUMENTS 6,515,442 B1 *  2/2003  Okubo et al. ................. 318/560
7,031,799 B2    4/2006  Kerner et al.

FOREIGN PATENT DOCUMENTS

EP           1 439 437        7/2004

* cited by examiner

*Primary Examiner* — Kenneth M Lo
*Assistant Examiner* — Geoffrey Wellman
(74) *Attorney, Agent, or Firm* — Kenyon & Kenyon LLP

(57) ABSTRACT

A closed-loop control structure for positioning a load with the aid of an electric motor includes a device for the active damping of unwanted, low-frequency vibrations. The closed-loop control structure has a position controller, a speed controller, and a current controller, which together, form a cascaded control loop. Damping signals which counteract unwanted, low-frequency vibrations are applied to the control loop, at least one first and one second damping signal of different phase angle being derived from a single sensor signal, and the first damping signal being injected between the position controller and the speed controller, and the second damping signal being injected between the speed controller and the current controller.

19 Claims, 3 Drawing Sheets

CLOSED-LOOP CONTROL STRUCTURE FOR DAMPING LOW-FREQUENCY VIBRATIONS

CROSS-REFERENCE TO RELATED APPLICATIONS

The present application claims priority to Application No. 10 2012 201 562.0, filed in the Federal Republic of Germany on Feb. 2, 2012, which is expressly incorporated herein in its entirety by reference thereto.

FIELD OF THE INVENTION

The present invention relates to a closed-loop control structure for damping low-frequency vibrations, e.g., on numerically controlled machine tools.

BACKGROUND INFORMATION

Low-frequency vibrations influence the surface quality of a machined workpiece considerably.

The numerical control of a machine tool controls the machining of a workpiece on the basis of a parts program in which a machining process is defined in many different machining cycles. A tool must follow a predefined path as precisely as possible, so that the form of the finished workpiece corresponds to the desired specifications. To that end, the various axes of the machine tool with their respective rotary or linear drives must be controlled accordingly.

In order to be able to adhere to a predefined machining path, closed-loop control structures are used which, in a position controller, calculate from the respective predefined setpoint position and the actual position of a machine axis, a setpoint speed (for linear drives) or setpoint rotational speed (for rotary drives), with which a position deviation is then intended to be corrected, if necessary. The difference between the setpoint speed and the actual speed is converted in a speed controller into a setpoint current which, multiplied by the motor constant of the drive, also corresponds to a setpoint torque of the drive. From this setpoint current—after comparison with the actual current—a setpoint voltage is computed in a current controller and is implemented in the drive amplifier and applied to the phases of the motor. Suitable measuring systems check the actual position of the respective drives, from which in each case the actual speed may be derived. Current sensors in the leads to the motor detect the actual current.

The connection between drive and tool is never completely rigid. On the contrary, it includes flexible, e.g., vibratory components. Therefore, mechanical resonances occur which, in the event of poor parameterization of the closed-loop control structure and/or low self-damping of the flexible components, may lead to unwanted vibrations. Due to the demand for increasingly higher bandwidth of the closed-loop control structures, achieved primarily by high amplification factors in the position control loop, such low-frequency resonant frequencies are also amplified and interfere with the tool path. Low-frequency vibrations in the range up to approximately 50 Hz are clearly visible as unwanted surface waviness in the machined workpiece.

Taking effect particularly negatively in the formation of such resonant vibrations is a negative phase rotation, as comes about especially due to the decelerations of the controlled system in interaction with the integral component of the speed controller. By reducing the corresponding amplification factor, the integral component may be reduced, and therefore the resonant vibration may be attenuated. At the same time, however, the rigidity of the machine tool and the quality of the disturbance correction decrease, as well.

European Patent No. 1 439 437 describes a closed-loop control structure for positioning a load with the aid of an electric motor, which has a device for the active damping of unwanted, low-frequency vibrations. The closed-loop control structure has a position controller, a speed controller and a current controller. In addition, damping signals which counteract unwanted, low-frequency vibrations are formed in the control loop. According to arrangement shown in FIG. 3 of European Patent No. 1 439 437, from a single sensor signal which includes the disturbing vibration, a first and a second damping signal of different phase angle are formed and are injected between the position controller and speed controller, to thus actively damp the interfering vibrations. Since according to this arrangement, the damping signals are obtained from the signals present in the control loop, external sensors which, for example, detect vibrations in the vicinity of the tool cannot be used.

SUMMARY

Example embodiments of the present invention provide a closed-loop control structure for positioning a load, which damps disturbing vibrations more effectively, and at the same time, is adaptable to widely varying application cases.

According to example embodiments of the present invention, a closed-loop control structure for positioning a load with the aid of an electric motor has a device for the active damping of unwanted, low-frequency vibrations. The closed-loop control structure has a position controller to which a deviation of an actual position of the load from a setpoint position is supplied, and which outputs a setpoint speed. In addition, the closed-loop control structure has a speed controller to which a deviation of an actual speed of the load from the setpoint speed is supplied and which outputs a setpoint current, as well as a current controller to which a deviation of an actual current of the motor from the setpoint current is supplied and which outputs a setpoint voltage for operating the motor. The position controller, speed controller and current controller together form a cascaded control loop.

Damping signals which counteract unwanted, low-frequency vibrations are applied to the control loop, at least one first and one second damping signal of different phase angle being derived from a single sensor signal, and the first damping signal being injected between the position controller and the speed controller, and the second damping signal being injected between the speed controller and the current controller.

The closed-loop control structure needs only a single sensor signal that contains the vibration to be damped, and is therefore not limited to application cases in which several sensors are used. Thus, a single position sensor on the motor or on the moving load is able to suffice. The parameterization of the device for the active damping succeeds comparatively easily, since the individual parameters influence one another only slightly. The closed-loop control structure is also robust with respect to changes such as altered masses, for example, which may shift the frequency of the disturbing resonance.

Since acceleration sensors are also suitable as source for a sensor signal to derive the damping signals, vibrations may be detected directly at or close to the location of interest and therefore damped, thus, for instance, at the tool center point of a machine tool, where vibrations are to be avoided. Namely, in contrast to position-measuring devices, such acceleration sensors may be placed close to such locations relatively easily.

With the device for vibration damping described herein, torsion vibrations between the drive and the load are able to be damped very successfully, but also mounting vibrations of a machine tool, as well as vibrations of the tool center point. The device for damping vibrations is therefore applicable very broadly.

Further features and aspects of example embodiments of the present invention are described in more detail below with reference to the appended Figures.

DETAILED DESCRIPTION

Figure 1:
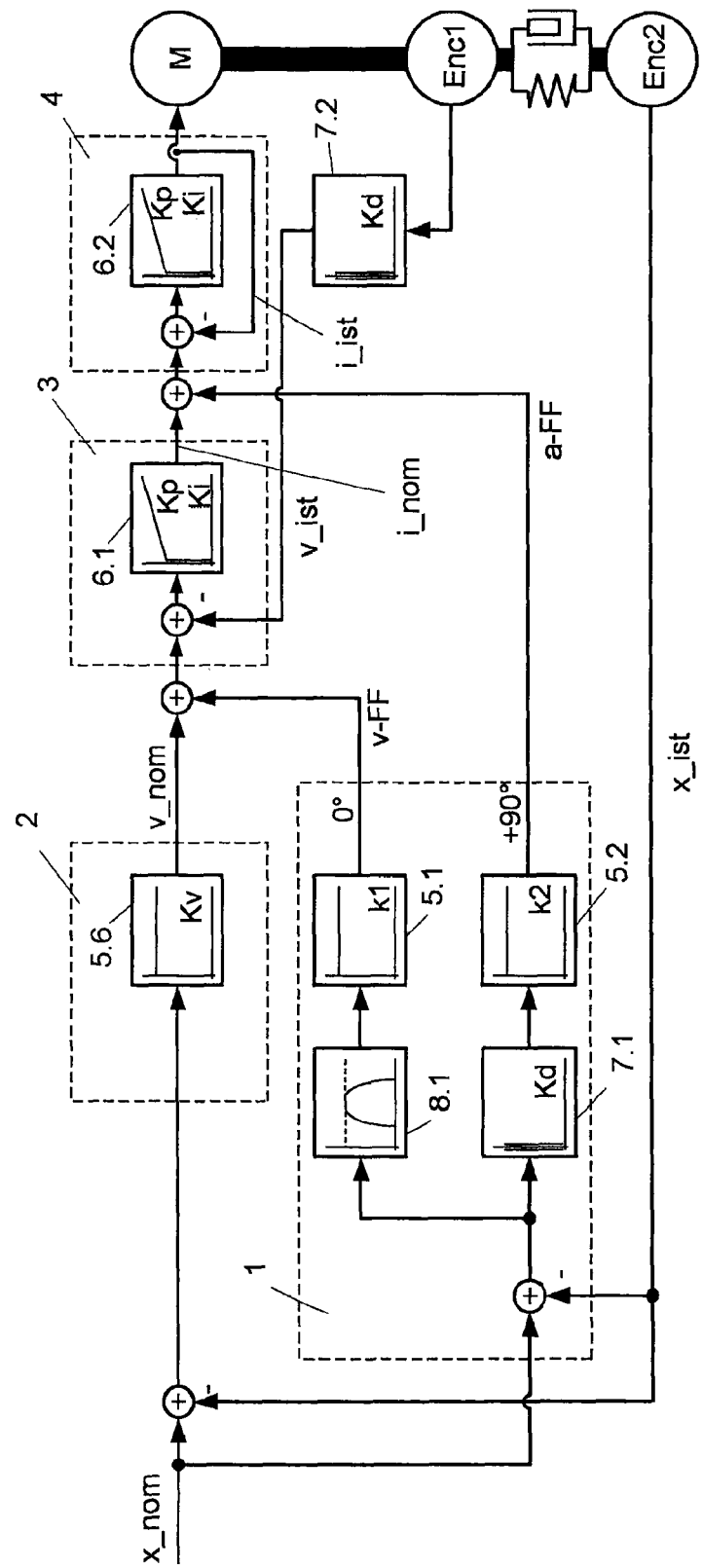
FIG. 1 schematically illustrates a closed-loop control structure.

In FIG. 1, a closed-loop control structure is schematically illustrated, having a position controller 2, a speed controller 3 and a current controller 4, for which setpoint values x_nom, v_nom, i_nom, respectively, are predefined. For example, setpoint position x_nom is provided by a superordinate numerical control.

From the difference between setpoint position x_nom and actual position x_ist, setpoint speed v_nom is determined in position controller 2 by a proportional element (P-element) 5.6. P-element 5.6 is a simple amplifier whose amplification factor Kv is parameterizable.

From the difference between setpoint speed v_nom and actual speed v_ist, current setpoint value i_nom is determined in speed controller 3 by a proportional-integral element (PI element) 6.1. In, e.g., a conventional, manner, the PI-element includes an amplifier and an integrator which, in parallel to each other, amplify and temporally integrate the input signal, the respective portions being parameterizable via amplification factors Kp and Ki.

From the difference between setpoint current i_nom and actual current i_ist, setpoint voltages are ascertained in current controller 4 by a further PI-element, and a power amplifier drives electric motor M based on the setpoint voltages.

In this context, the position of motor M is ascertained by a rotary encoder Enc1. The position signal of rotary encoder Enc1 is derived as a function of time in a differentiator (D-element) 7.2 and supplied as actual speed v_ist to the control loop.

Since the load is not joined rigidly to motor M, the position of the load is measured directly by a separate position-measuring device Enc2. The position signal from this position-measuring device Enc2 is supplied as actual position x_ist to the control loop.

In particular, the non-rigid connection between motor and load, which is indicated in FIG. 1 with a spring-/damping symbol, leads to unwanted vibrations in the overall system, particularly when resonances are excited in the overall system by the variation in setpoint position x_nom with time.

In parameterizing such a closed-loop control system, one must therefore consider carefully whether, due to significant amplification factors Kv, Kp, Ki, the loop controller should react particularly quickly to deviations—in this case, the system being prone increasingly to vibrations—or whether more likely amplification factors Kv, Kp, Ki should avoid the excitation of vibrations, in which case the system then only corrects deviations slowly, and therefore deviates further from predefined setpoint position x_nom.

In this context, according to example embodiments of the present invention, a device 1 is intended to help actively damp unwanted vibrations, and thus the advantages of high amplification factors Kv, Kp, Ki are able to be combined with a nevertheless low tendency to unwanted vibrations.

To that end, damping signals v-FF and a-FF, which are formed on the basis of a single sensor signal, are made available in device 1. In this exemplary embodiment, actual position x_ist is utilized as the single sensor signal. This sensor signal includes any unwanted vibration of the load. Alternatively, other sensor signals would also be suitable, for example, the position of motor M or the actual current i_ist of the motor.

In device 1, as in position controller 2, first of all, the difference is formed between setpoint position x_nom and actual position x_ist, in order to separate the unwanted vibrations from the desired movement of the load.

In a first branch for forming first damping signal v-FF, this difference is amplified by a first P-element 5.1, the amplification factor k1 of P-element 5.1 being parameterizable.

The signal for forming first damping signal v-FF preferably also passes through a bandpass filter 8.1 which is set to the vibrational frequency to be damped. Such disturbing resonant frequencies typically lie in the range between 10 and 50 hertz. An important effect of bandpass filter 8.1 is that for very low frequencies (e.g., less than 5 hertz), the device no longer has effects on the control loop. Instead of bandpass filter 8.1, a high-pass filter could also be used, which cuts off the low frequencies.

In a second branch for forming second damping signal a-FF, the difference is derived as a function of time from the setpoint position and the actual position in a D-element 7.1, that in turn is parameterizable by an amplification factor Kd. In addition, the signal for forming second damping signal a-FF passes through a second proportional element 5.2, amplification factor k2 of second P-element 5.2 being parameterizable. Second damping signal a-FF is injected additively between speed controller 3 and current controller 4.

Due to the phase-shifting effect of D-element 7.1 in the second branch, first and second damping signals v-FF and a-FF, respectively, have different phase angles. Because of the time derivation in D-element 7.1, the phase of the disturbing vibration is ahead by approximately 90 degrees relative to the vibration obtained by forming the difference between setpoint position x_nom and actual position x_ist. Expressed differently, second damping signal a-FF is ahead of first damping signal v-FF by 90 degrees.

This second damping signal a-FF, ahead of the disturbing vibration by 90 degrees, is injected additively downstream of speed controller 3. Because of the phase-shifting effect of the integrator in speed controller 3, which shifts the phase not by +90 degrees like a D-element, but rather ideally by −90 degrees, the disturbing vibration is canceled at the injection point of the second damping signal.

A further important effect of D-element 7.1 is based on the fact that low frequencies are more likely damped and high frequencies amplified. The requirement, already mentioned in connection with bandpass filter 8.1, that for small frequencies, device 1 should have no effect on the control loop, is thus satisfied in the second branch by the frequency response characteristic of D-element 7.1.

It should be noted that the assumption of the phase-shifting effect of the integrator in speed controller 3 of −90 degrees is idealized here. Even a well-adjusted speed controller 3 brings about only a phase shift by −85 degrees. For example, a poorly-adjusted speed controller may even bring about a phase shift of only −45 degrees. Therefore, in the following exemplary embodiment, additional measures are described by which sufficient damping of disturbing vibrations may nevertheless be achieved, as the device is adaptable to the real circumstances.

Figure 2:
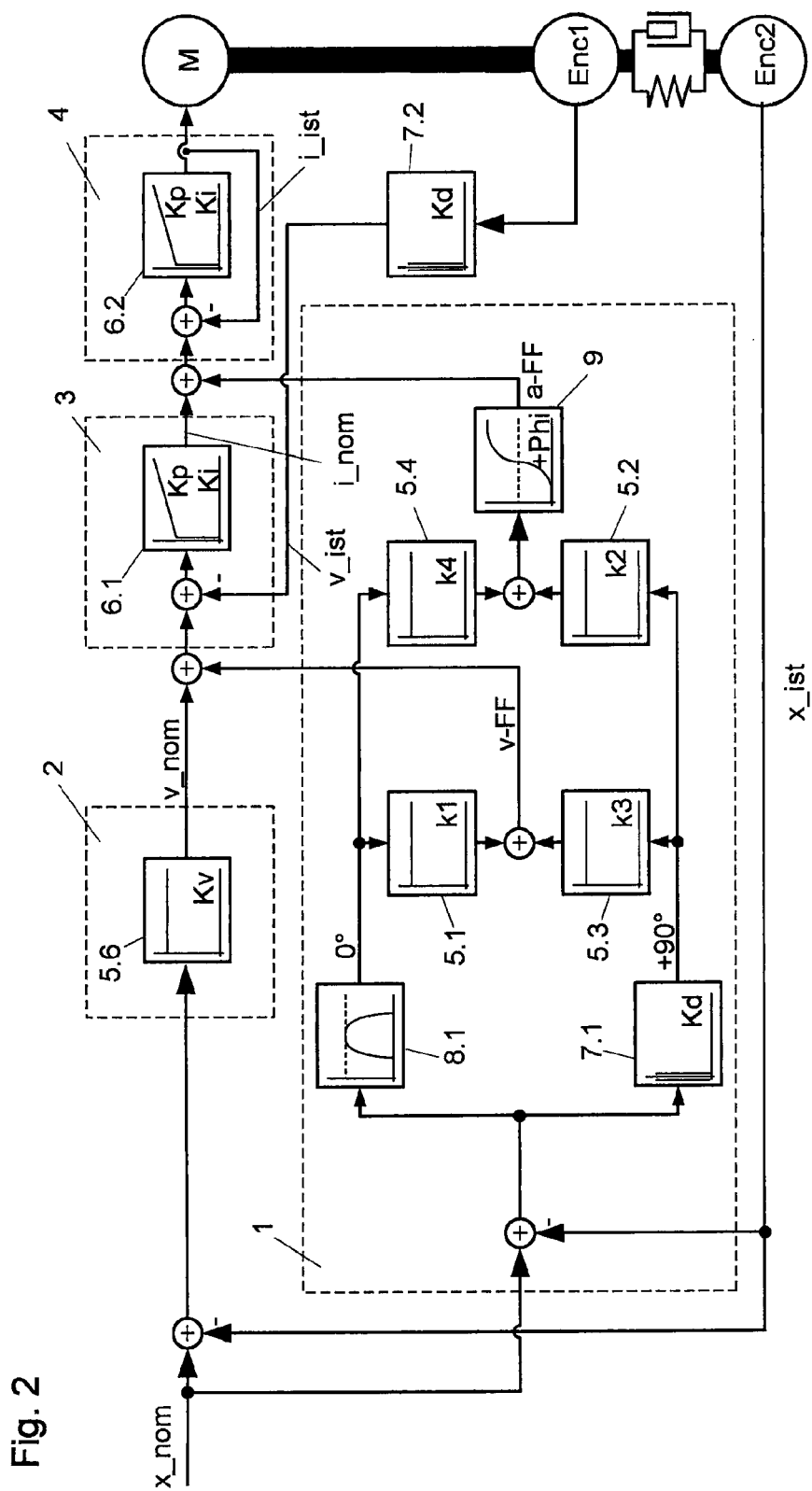
FIG. 2 schematically illustrates a closed-loop control structure having additional possibilities for parameterization.

All components of the closed-loop control structure shown in FIG. 1 are found again in FIG. 2. These elements are provided with identical reference numerals and are not described again here, because their function is unchanged. However, the closed-loop control structure in illustrated in FIG. 2 is expanded by a few components.

Prior to being injected between speed controller 3 and current controller 4, second damping signal a-FF passes through a phase shifter 9 having a parameterizable phase shift +Phi. For example, a differential element with delay of the first order (DT1-element) may be used successfully as phase shifter 9. Thus, it is possible to adjust the phase angle of second injection signal a-FF optimally to the phase angle— determined substantially by the integrator in speed controller 3—of the disturbing vibration present at the output of the speed controller, and to achieve the best possible cancellation or damping.

In addition, FIG. 2 shows a third P-element 5.3, parameterizable by a third amplification factor k3, via which a portion of second damping signal a-FF, picked off downstream of D-element 7.1, is added to the output of first P-element 5.1. In this manner, a parameterizable portion of second damping signal a-FF may be added to first damping signal v-FF. Thus, an additional degree of freedom is obtained in the parameterization of the overall closed-loop control structure.

In the same manner, FIG. 2 shows a fourth P-element 5.4, parameterizable by a fourth amplification factor k4, via which a portion of first damping signal v-FF, picked off downstream of bandpass filter 8.1, is added to the output of second P-element 5.2. In this manner, a parameterizable portion of first damping signal v-FF may be added to second damping signal a-FF. Additional degrees of freedom are obtained in the parameterization of the closed-loop control structure, as well.

If, in the arrangement illustrated in FIG. 2, the phase shift of phase shifter 9 is selected to be Phi=0 and the amplification factors of third and fourth P-elements are selected to be k3=0 and k4=0, then the arrangement illustrated in FIG. 1 is obtained, because the elements by which the arrangement illustrated in FIG. 1 is expanded are then ineffective.

If only one or two of the three parameters +Phi, k3 or k4 is selected to be different from zero, then further arrangements result in which, of the three additional elements, phase shifter 9 or third and fourth P-elements 5.3, 5.4, respectively, in each case only those are present whose parameter is different from zero.

Figure 3:
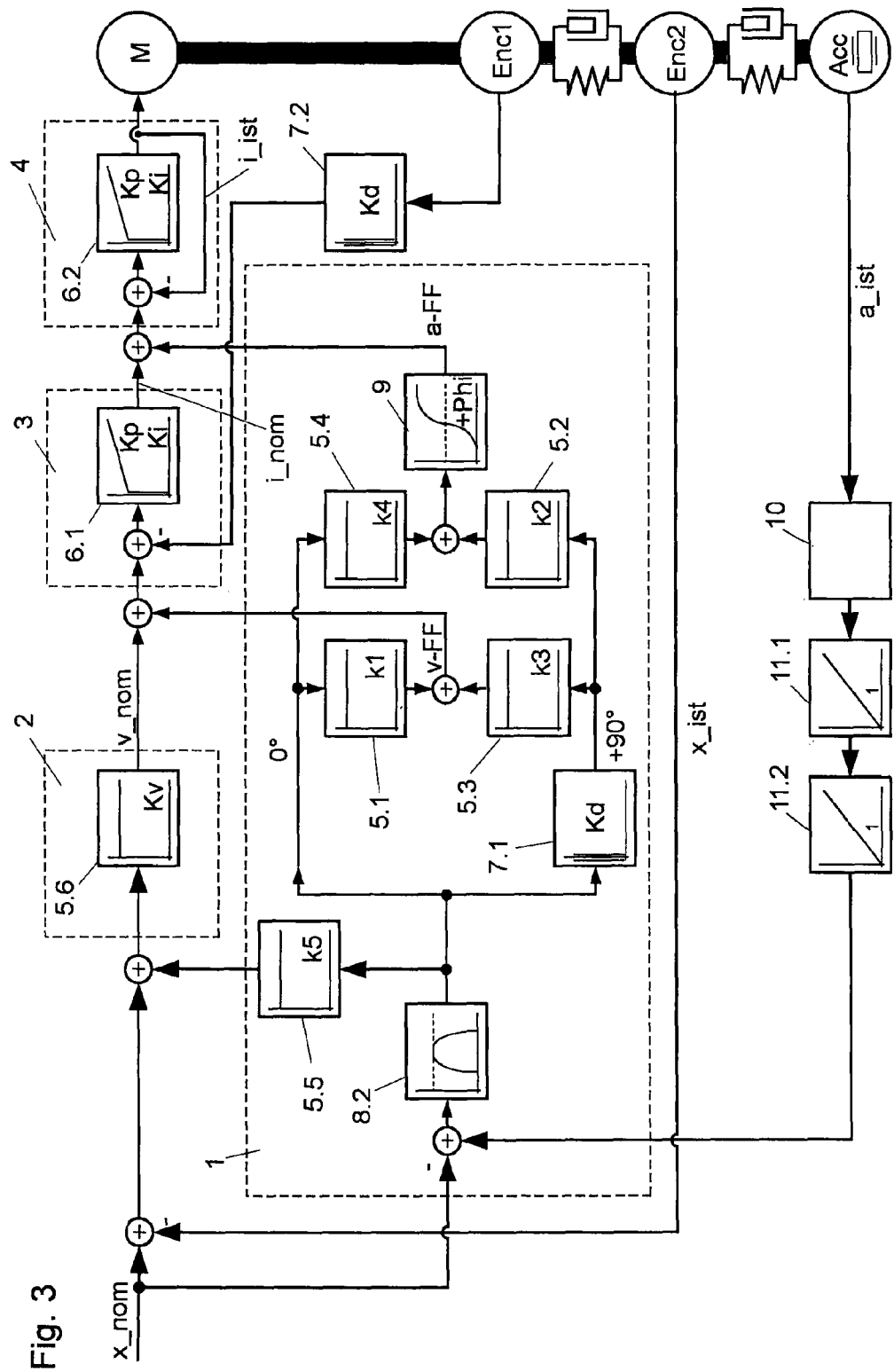
FIG. 3 schematically illustrates a closed-loop control structure having an acceleration sensor, from which damping signals are derived.

FIG. 3 illustrates an acceleration sensor Acc that is used as source for the sensor signal, from which device 1 forms damping signals v-FF, a-FF and, in addition, x-FF. After removing the direct component with the aid of a filter 10, acceleration a_ist of the load, ascertained by acceleration sensor Acc, is integrated twice in two integrator elements 11.1, 11.2, to thus be able to infer a change in position.

It may be that the direct component of the position value formed by double integration is indefinite, however, since only disturbing vibrations are of interest, this direct component may be filtered out. In this arrangement, this is accomplished by initially passing the difference between setpoint position x_nom and twice-integrated acceleration a_ist through a bandpass filter 8.2 before the signal, e.g., freed of the direct component, is split into three branches to form individual damping signals v-FF, a-FF and x-FF.

In addition, the measure of already placing bandpass filter 8.2 upstream of the division into the various branches (and not in the first branch as in FIGS. 1 and 2) has the advantage that no very high frequencies arrive in D-element 7.1 of the second branch. The noise of this D-element is therefore reduced.

The first branch again forms first damping signal v-FF and corresponds substantially to the first branch of the arrangement illustrated in FIG. 2. Only bandpass filter 8.1 is missing in this branch, because the signal for forming first damping signal v-FF has already passed through bandpass filter 8.2.

The second branch for forming second damping signal a-FF corresponds completely to the second branch of the above-described arrangement.

In FIG. 3, one can see that a third branch for forming a third damping signal x-FF branches off from the output of second bandpass filter 8.2 and is applied, via a fifth proportional element 5.5 having a parameterizable amplification factor k5, to the input of position controller 2. The application of third damping signal x-FF prevents position controller 2 from counteracting the damping effect, which is achieved by the injection of damping signals v-FF and a-FF.

The closed-loop control structures of the above-described arrangements are discussed in a general manner of representation customary in automatic control engineering. They may be implemented in various manners. In so doing, it is possible to differentiate roughly between analog control loops that are arranged with the aid of operational amplifiers, for example, and a digital implementation in which a closed-loop control structure is reproduced in software.

What is claimed is:

1. A closed-loop control structure for positioning a load with the aid of an electric motor, comprising:
    an arrangement adapted to actively damp unwanted, low-frequency vibrations;
    a position controller adapted to receive a deviation of an actual position of the load from a setpoint position and to output a setpoint speed;
    a speed controller adapted to receive a deviation of an actual speed of the load from the setpoint speed and to output a setpoint current;
    a current controller adapted to receive a deviation of an actual current of the motor from the setpoint current and to output a setpoint voltage for operating the motor;
    wherein damping signals adapted to counteract unwanted, low-frequency vibrations are injectable in the control loop;
    wherein a first damping signal and a second damping signal of different phase angle are derivable from a single sensor signal;
    wherein the first damping signal is injectable between the position controller and the speed controller; and
    wherein the second damping signal is injectable between the speed controller and the current controller.

2. The closed-loop control structure according to claim 1, wherein the sensor signal includes a value proportional to the actual position of the load, and wherein the damping signals are formed from a subtraction of the value proportional to the actual position of the load from the setpoint position.

3. The closed-loop control structure according to claim 2, further comprising a first proportional element having a first parameterizable amplification factor adapted to form the first damping signal from the difference between the value proportional to the actual position of the load from the setpoint position.

4. The closed-loop control structure according to claim 3, wherein the first damping signal additionally passes through a bandpass filter that is set to a vibrational frequency to be damped.

5. The closed-loop control structure according to claim 3, further comprising:
   a differentiating element and a second proportional element having a second parameterizable amplification factor adapted to form the second damping signal from the difference between the value proportional to the actual position of the load from the setpoint position; and
   a third proportional element having a third parameterizable amplification factor adapted to form the first damping signal by adding a portion of the second damping signal, picked off downstream of the differentiating element, to an output of the first proportional element.

6. The closed-loop control structure according to claim 3, further comprising:
   a differentiating element and a second proportional element having a second parameterizable amplification factor adapted to form the second damping signal from the difference between the value proportional to the actual position of the load from the setpoint position; and
   a fourth proportional element having a fourth parameterizable amplification factor adapted to form the second damping signal by adding a portion of the first damping signal, picked off upstream of the first proportional element, to an output of the second proportional element.

7. The closed-loop control structure according to claim 2, further comprising a differentiating element and a second proportional element having a second parameterizable amplification factor adapted to form the second damping signal from the difference between the value proportional to the actual position of the load from the setpoint position.

8. The closed-loop control structure according to claim 2, further comprising a second bandpass filter, the difference between the value proportional to the actual position of the load from the setpoint position being passed through the bandpass filter, the damping signals being derivable from an output signal of the bandpass filter.

9. The closed-loop control structure according to claim 8, wherein a third damping signal branches off from the output of the second bandpass filter and is applied, via a fifth proportional element having a parameterizable amplification factor, to an input of the position controller.

10. The closed-loop control structure according to claim 1, wherein the sensor signal includes a value proportional to an acceleration of the load.

11. The closed-loop control structure according to claim 10, further comprising two integrator elements, wherein the damping signals are formed from the sensor signal passing through the two integrator elements and then being subtracted from the setpoint position.

12. The closed-loop control structure according to claim 11, further comprising a first proportional element having a first parameterizable amplification factor adapted to form the first damping signal from the difference between the setpoint position and the sensor signal after passing through the two integrator elements.

13. The closed-loop control structure according to claim 12, wherein the first damping signal additionally passes through a bandpass filter that is set to a vibrational frequency to be damped.

14. The closed-loop control structure according to claim 12, further comprising:
   a differentiating element and a second proportional element having a second parameterizable amplification factor adapted to form the second damping signal from the difference between the setpoint position and the sensor signal after passing through the two integrator elements; and
   a third proportional element having a third parameterizable amplification factor adapted to form the first damping signal by adding a portion of the second damping signal, picked off downstream of the differentiating element, to an output of the first proportional element.

15. The closed-loop control structure according to claim 12, further comprising:
   a differentiating element and a second proportional element having a second parameterizable amplification factor adapted to form the second damping signal from the difference between the setpoint position and the sensor signal after passing through the two integrator elements; and
   a fourth proportional element having a fourth parameterizable amplification factor adapted to form the second damping signal by adding a portion of the first damping signal, picked off upstream of the first proportional element, to an output of the second proportional element.

16. The closed-loop control structure according to claim 11, further comprising a differentiating element and a second proportional element having a second parameterizable amplification factor adapted to form the second damping signal from the difference between the setpoint position and the sensor signal after passing through the two integrator elements.

17. The closed-loop control structure according to claim 11, further comprising a second bandpass filter, the difference between the setpoint position and the sensor signal after passing through the two integrator elements being passed through the bandpass filter, the damping signals being derivable from an output signal of the bandpass filter.

18. The closed-loop control structure according to claim 17, wherein a third damping signal branches off from the output of the second bandpass filter and is applied, via a fifth proportional element having a parameterizable amplification factor, to an input of the position controller.

19. The closed-loop control structure according to claim 1, further comprising a phase shifter having a parameterizable phase shift, the second damping signal passing through the phase shifter prior to injection between the speed controller and the current controller.

* * * * *